United States Patent [19]

Van Biesen et al.

[11] 3,969,624

[45] July 13, 1976

[54] ELECTROSTATIC IMAGING DEVICE AND PROCESS USING SAME

[75] Inventors: Jozef Antoon Van Biesen, Boechout; Jan Van den Bogaert, Schilde, both of Belgium

[73] Assignee: AGFA GEVAERT N.V., Mortsel, Belgium

[22] Filed: Feb. 18, 1975

[21] Appl. No.: 550,575

Related U.S. Application Data

[63] Continuation of Ser. No. 420,557, Nov. 30, 1973, abandoned.

[30] Foreign Application Priority Data

May 21, 1973 United Kingdom .............. 24169/73

[52] U.S. Cl. ........................ 250/315 R; 250/315 A

[51] Int. Cl.[2] ........................ G03B 41/16

[58] Field of Search ......... 250/213 VT, 315, 315 A, 250/324, 325, 326; 346/74 CR, 74 ES, 74 EB; 355/3 R, 17

[56] References Cited

UNITED STATES PATENTS

| | | | |
|---|---|---|---|
| 3,343,025 | 9/1967 | Ignatowski | 250/213 VT |
| 3,394,261 | 7/1968 | Manley | 250/213 VT |
| 3,710,125 | 1/1973 | Jacobs | 250/315 A |
| 3,774,029 | 11/1973 | Muntz | 250/315 A |

FOREIGN PATENTS OR APPLICATIONS

| | | | |
|---|---|---|---|
| 1,497,093 | 8/1970 | Germany | 250/315 A |

*Primary Examiner*—Craig E. Church
*Attorney, Agent, or Firm*—William J. Daniel

[57] ABSTRACT

A method of recording with an electrostatic imaging device in terms of an electrostatic charge pattern, a charged particles emission pattern representing information to be recorded and generated in the interior of an envelope which contains an ionizable gas medium and comprises an insulating target towards which charged particles are projected. The envelope contains between a means producing the charged particles emission pattern and the insulatng target which is demountable or removable from the envelope a solid state device comprising a plurality of narrow passages of which the input openings are directed to or contacting the means producing the charged particles emission pattern and its windowless output-openings are directed to the insulating target.

8 Claims, 4 Drawing Figures

ELECTROSTATIC IMAGING DEVICE AND PROCESS USING SAME

This is a continuation of Ser. No. 420,557, filed Nov. 30, 1973 now abandoned.

This invention relates to the formation of electrostatic charge patterns upon a substrate and devices for producing such patterns.

From the German Patent Specification No. 1,497,093 an imaging technique is known in which a photocathode is used to produce an electrostatic charge pattern on a non-photosensitive insulating material. In this technique an air-tight chamber is filled with an ionizable gas e.g. a mixture of argon and monobromotrifluoromethane (1:5) and is provided with a photocathode and an anode, the latter being covered with an insulating recording material e.g. insulating resin sheet. Simultaneously with an object-wise modulaed X-ray exposure a direct current potential is applied across the electrodes so that the photoelectrons, which are ejected image-wise from the photocathode, are strongly multiplied by an avalanching process in the ionizable gas. The electrons are collected on the insulating material in an image pattern corresponding to the intensity of the imaging radiation absorbed in the photocathode.

The distance in the gas medium to be travelled by the photo-electrons determines the amount of electrons produced in the avalanche and collected on the insulating material. The increase of the distance, however, also increases the sideways spreading of the electrons and results in a considerable reduction in image sharpness.

In one embodiment of said German Patent Specification in order to prevent reduction in image sharpness by electron divergence a screen with minute holes is provided on an heavy metal electrode emitting photo electrons. The minute holes of the screen, the diameter of which may be e.g. 0.2 mm and the depth e.g. 0.8 mm can be made in a plastic material or metal screen. By means of a screen having the above hole dimensions, the photo-electrons which, when liberated by X-rays, are emitted in all directions from the heavy metal layer are directed in such a way that the ones diverging by more than 15° from the perpendicular on the plane of the electrode become absorbed. On one side of the screen the hole sides are connected with the electrode, on the other side the holes are covered with a thin, e.g. 0.01 mm thick aluminium foil. In order to oppose little resistance to the electrons, the screen interstices may be filled with gas consisting of light weight molecules e.g. air.

According to the above embodiment the aluminium foil covering the openings of the screen serves as an electrode and the electrons emitted therefrom interact with the ionizable gas particles and effect the avalanching process. Operating that way, the sideways spreaded electrons present in the electron-multiplying avalanche are not removed by the above defined screen and still impair the image sharpness. So, the above described embodiment, which is interesting for eliminating electrons that are emitted obliquely from the photocathode does not remedy for image unsharpness resulting frrm the sideways electron spreading in the electron multiplicating avalanche in the ionizable gas medium.

The present invention aims to provide means and methods which bring about improved image sharpness in the image formation with a photocathode operating in direct contact with a low pressure ionizable gas medium.

According to the present invention, a method of recording in terms of an electrostatic charge pattern, a charged particles emission pattern representing information to be recorded and generated in the interior of an envelope which contains an ionizable gas medium e.g. low pressure gas medium and comprises an insulating target towards which the charged particles e.g. electrons of the charged particle emission pattern are projected, is characterized in that in said envelope between a means producing the charged particle emission pattern and the insulating target which is demountable or removable from the envelope a device containing a plurality of narrow passages is interposed of which its input-openings are directed to or contacting the means producing the charged particle emission pattern and its windowless output-openings are directed to the insulating target.

The information-wise distributed pattern of emitted charged particles is herein referred to as "the charged particles emission pattern or image."

The charged particles emission image may be produced by making use of a photocathode or photocathode system by information-wise exposing such cathode to a pattern of radiant energy representing the information to be recorded thereby causing the emission of photoelectrons in a pattern corresponding with the pattern of radiant energy.

In general it is envisaged that the electrostatic charge pattern is built up by electrons, however, the wording "charged particle emission image" includes here likewise an elecrostatic charge pattern which is built up by positive ions resulting e.g. from an electrical discharge in the gas present in the envelope.

Several embodiments in which the device containing a plurality of narow passages i.e. "microchannels" is used for improving the image sharpness are illustrated in the accompanying drawings, in which.

It should be understood that in these figures some dimensions of the layers, photocathode, microchannel plate, insulating target sheet, etc., have been greatly exaggerated to show the details of the construction. No inferences should be drawn as to the relative dimensions of the layers or spacing separating the various elemental parts of the imaging apparatus.

Figure 1:
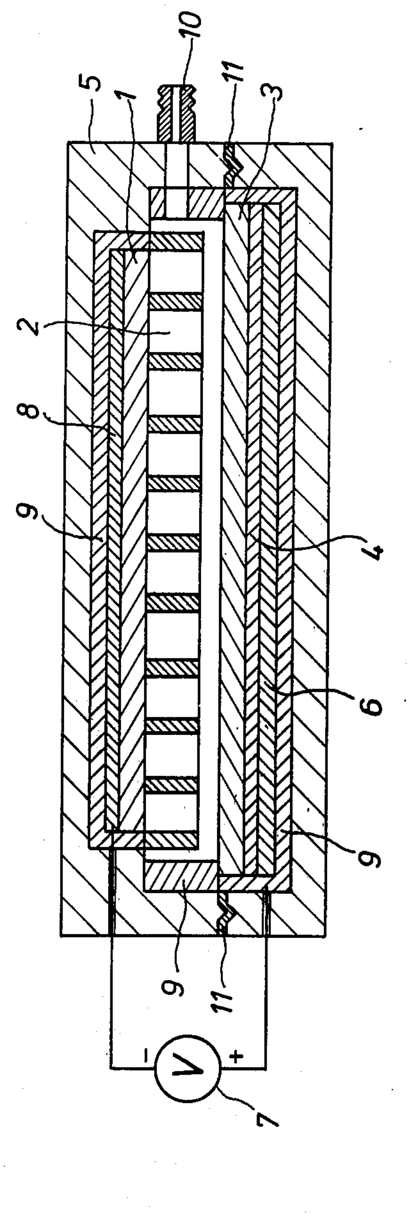
FIG. 1 is a schematic sectional view of a recording system structure including a photocathode, a microchannel device and a removable insulating target sheet.

Referring to FIG. 1 the imaging apparatus comprises a photocathode 1, a microchannel plate 2 the input openings of which are in contact with the photocathode 1 and the output-openings of which are directed to a removable insulating charge receiving sheet 3, e.g. insulating resin film coated at the rear side with a transparent conductive layer 4. The microchannel plate 2 is made of electrically insulating material e.g. an insulating resin or glass and is in direct contact with the photocathode 1. The insulating charge receiving sheet 3 is enclosed in a cassette 5 from which it can be removed. The conductive layer 4 makes intimate contact with the conductive layer or plate 6 that is connected to the plus pole of a DC-voltage source 7, the negative pole of that voltage source being connected to a conductive backing layer 8 of the photocathode 1. The cassette 5 contains electrically insulating coatings 9 on its inner walls. The demountable cassette 5 can be evacuated and provided with ionizable gas at desired pressure through the pipe fitting 10. The compressable sealing strips 11 e.g. made of polytetrafluorethylene provide an air-tight assembly of the two cassette parts.

The cassette 5 is filled with an ionizable gas or gas mixture e.g. (a) rare gas(es) in admixture with a discharge quenching substance e.g. ethanol as described e.g. in the German patent Specification No. 1,497,093. The filling gas is advantageously kept under a pressure of 0.1 to 10 Torr preferably 1 to 5 Torr above atmospheric pressure. A useful gas mixture consists e.g. of argon and monobromotrifluoromethane ($CF_3Br$) in the weight ratio 1:5. When using the above fluoromethane a separate quenching additive is not required. The applied D.C. voltage is preferably not more than 5 percent above the breakdown voltage of the gas.

The ionizable gas or gas mixture has not necessarily to be used at atmospheric pressure or reduced pressure. A xenon gas containing visible-light-emitting imaging device operating at pressures above atmospheric pressure e.g. 2 atmospheres has been described by A. Lansiart et al. in Nuclear Instruments and methods 44 (1966) 45-54 - North-Holland Publishing Co. An electrostatic imaging device operating at a pressure above atmospheric pressure with an ionizable gas having an atomic number at least equal to 36 e.g. xenon has been described in the Belgian Pat. No. 792,334.

The height of the microchannel plate 2 and the cross-section of each individual microchannel determine the image sharpness. A suitable cross-section diameter is e.g. from 10 to 200 microns. The ratio of cross-section diameter to the height of the individual microchannels is preferably at least 1:4.

The distance between the windowless output opening ends of the microchannel plate and of the insulating charge receiving sheet 3 is preferably not larger than 1.5 mm.

According to a particular embodiment the windowless opening ends of the microchannel plate make contact with the insulating sheet, whereby that sheet is kept preferably flat and in case of pressure contact with said window-less opening ends a very homogeneous electrical contact between the electrically conductive layer 4 and the electrically conductive layer or plate 6 is obtained.

The total potential difference between the photocathode and the rear side of the insulating target material forms an accelerating field acting upon the electrons and determines together with the kind of ionizable gas and its pressure the degree of the electron avalanching effect.

According to a special embodiment the microchannel plate is an assembly of electrically insulating resin or glass sheets or conductive sheets e.g. metal sheets that whether or not are coated with an insulating material e.g. insulating resin. Said sheets are corrugated in a direction parallel to the desired path of electron flow, so that said corrugations cooperate to provide parallel channels or conduits for said electrons. The manufacture of such channel plates but having secondary-emissive characteristics has been described in the United Kingdom Pat. No. 954,248. Other techniques for producing microchannel plates are described in the United Kingdom Pat. Specifications Nos. 1,064,072 and 1,064,075. For the purpose of the embodiment discussed in connection with FIG. 1 the materials of the plate are chosen in such a way that secondary emission on the microchannel walls does not or not substantially occur under the conditions of voltage, gas composition and gas pressure applied in the imaging apparatus of FIG. 1. Indeed, secondary emission resulting from so-called "ionic feed-back" (see IEEE Transactions on Nuclear Science Vol. NS-13 June 1966, pages 88–99 has to be avoided since at a particular gas pressure normally above $10^{-4}$ Torr (see Advances in Electronics and Electron Physics Vol. 28 (1969) pages 499–506) a self-sustaining discharge is obtained in the gas-medium which discharge degrades the electrostatic charge image on the insulating target. The ionic feedback is a phenomenon which arises when ions produced at the output end of the channels are accelerated back down the channels and set free secondary electrons by striking the secondary emissive inner walls at the input ends of the channels the electron density may be increased thereby in such a degree that a self-sustaining discharge occurs, which has to be avoided.

The exposure of the photocathode e.g. with informationwise modulated X-rays may proceed from the rear side (i.e. the side adjacent to the microchannels) or front side e.g. proceeds as described in the U.S. Pat. Nos. 2,221,776 and 3,526,767 or as in the published German Pat. Application No. 2,231,954.

Figure 2:
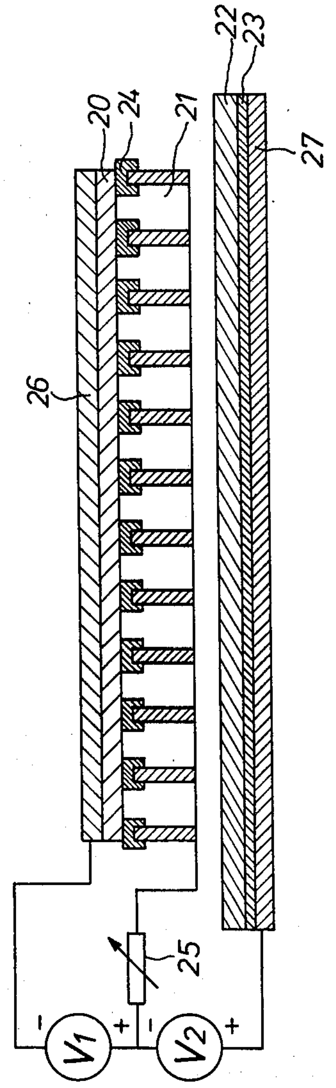
FIGS. 2 and 3 are cross-sectional representations of alternative imaging structures containing a photocathode, a microchannel device and a removable insulating target sheet.

Referring to FIG. 2 the imaging apparatus comprises a photocathode 20, a microchannel plate 21 the openings of which are directed to an insulating charge receiving sheet 22 e.g. insulating resin film coated at the rear side with a transparent conductive layer 23. The microchannel plate 21 is in close proximity e.g. it input-openings are at a distance less than 0.5 mm or in contact (the contact embodiment is shown in the FIG. 2) with the photocathode 20. The input-openings of the microchannel plate make no electrically conductive contact wih the photocathode material. Therefore, when using as illustrated in the present FIG. 2 electrically conductive microchannels e.g. composed of metal sheets e.g. aluminium sheets which are corrugated in a direction parallel to the desired path of electron flow, the input opening ends of the channels have been coated with an electrically insulating material 24 e.g. applied by dipping them in an insulating hardenable resin, by vacuum coating with an insulating substance or by oxidation of the metal e.g. aluminium, obtaining that way an electrically insulating oxide layer preventing direct electric contact with the photocathode.

The output-opening ends of the microchannel plate 21 are electrically connected through a variable resistor 25 with the plus pole of a DC-voltage source V1, the minus pole is connected to the electrically conductive support 26 of the photocathode 20. The conductive layer or rer side 23 of the insulating target sheet 22 is electrically connected through the conductive support 27 with the plus pole of the voltage source $V_2$.

The ratio of cross-section diameter to the height of the individual microchannels is preferably at least 1:4. By operating with such a microchannel plate of which the inner walls at least over a part of the length of the channels are electrically conductive, electrons that deviate for more than 15° from the perpendicular between the photocathode 20 and charge receiving insulating sheet 22 are carried off to the positive pole of the voltage source V1. The variable resistor 25 determines the voltage difference and the rate of the carrying off of the sideways spread electrons.

The distance between the output-opening ends of the microchannel plate 21 and of the insulating charge receiving sheet 22 is preferably not larger than 1.5 mm in order to obtain good image-sharpness.

In FIG. 2 the envelope walls that are provided with a pipe fitting as illustrated in FIG. 1 are not shown.

Figure 3:
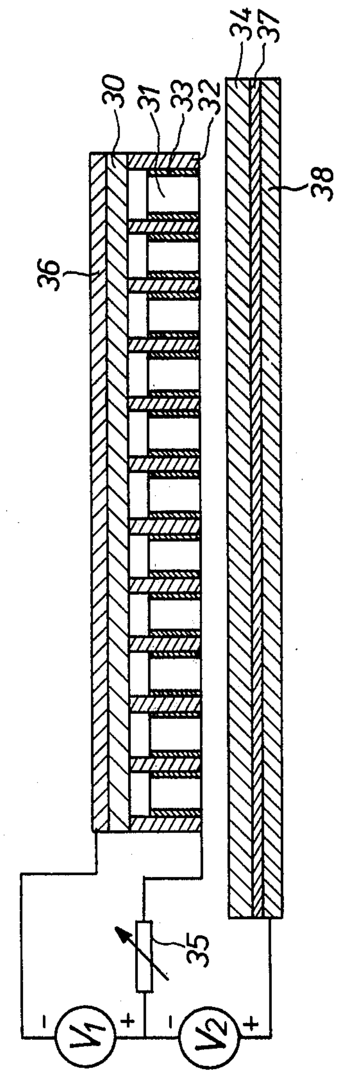

According to an other embodiment illustrated in FIG. 3 the imaging apparatus comprises a photocathode 30 and a microchannel plate 31 of electrically insulating material e.g. a microchannel plate 31 formed of an assembly of parallel glass tubes manufactured e.g. according to a technique described in the United Kingdom Pat. Specification No. 1,064,072 or a technique described by G. Eschard and R. Polaert in Philips Technisch Tijdschrift, 30 (1969) pages 257–261. The inner walls of the glass tubes 32 are provided with a conductive material 33 e.g. metal layer applied by vacuum coating but a part at the input-opening end of the tubes is left free from such conductive coating or that coating is removed in that part e.g. by etching. The output openings of the microchannel plate 30 are directed to an insulating charge receiving sheet 34 e.g. insulating resin film coated at the rear side with a transparent conductive layer 37. The microchannel plate 31 is with its insulating input opening ends in contact with the photocathode 30.

The output-opening ends of the microchannel plate 31 are electrically connected through a variable resistor 35 with the plus pole of a DC-voltage source V1, the minus pole being connected to the electrically conductive support 36 of the photocathode 30. The conductive layer or rear side of the insulating target sheet 34 is electrically connected through the conductive support 38 with the plus pole of the voltage source V2.

The apparatus illustrated in FIG. 3 is operated in the way as described in connection with FIG. 2. The envelope walls with pipe fitting as illustrated in FIG. 1 are not shown.

For the purpose of the embodiments discussed in connection with FIG. 2 and FIG. 3 the inner walls of the microchannels are for the major part of their lengh (preferably for at least 50 percent) electrically conductive so that the conductive wall material or conductive inner coatings offer an electrical resistance preferably less than $10^6$ Ohm per sq. cm between the beginning of the conductive material near the input-openings and the output-openings of the channel plate.

Figure 4:
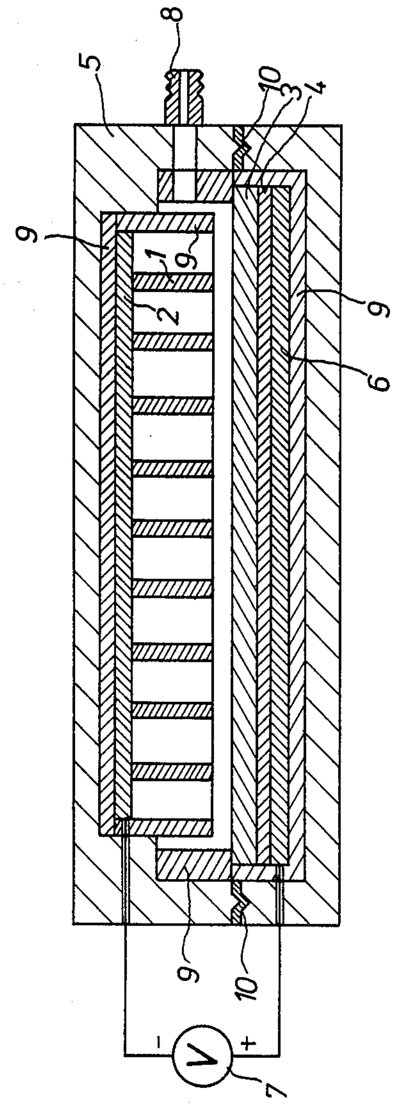
FIG. 4 is a cross-sectional representation of a special embodiment of the present invention, in which embodiment the microchannel device and photocathode are the same structural part of an imaging appliance according to the present invention.

According to a special embodiment illustrated in FIG. 4 the means producing the electron discharge pattern and the solid state device comprising a plurality of narrow passages is one and the same part of the electrostatic imaging device.

In that embodiment the photocathode contains a plurality of lamella that may be corrugated or grooved in a direction parallel to that of the desired path of electrons through the device, so that said corrugations or grooves co-operate to provide said parallel channels or conduits. According to an other embodiment the photoelectron emitting device contains hollow fibres (narrow tubes) of which at least a part of the wall material has photo-electron emitting properties when struck with penetrating radiation e.g. X-rays, γ- and β-rays, fast electrons or neutrons.

It has been established theoretically and experimentally (see e.g. A. H. Compton and S. K. Allison, "X-rays in Theory and Experiment", N.Y., (1935) 564–582), that the major part of photo-electrons are set-free in a direction perpendicular to the propagation direction of the X-rays. In comparison with a flat photo-electrode which is struck by X-rays at an angle of about 90° the phtotelectrode in lamella or narrow tube form presents a plurality of small walls or edges substantially parallel with the x-rays so that the X-rays are absorbed therein over a much longer path and consequently photoelectrons are emitted at a larger amount. The electrons collide with the gasmolecules present in the interspaces between the lamellae or inner spaces of the narrow tubes and set free a further amount of electrons by ionisation. By using for the wall material of the lamellae or tubes an element or mixture or compound containing elements with high atomic number (Z equal to or larger than 50, preferably larger than 70) a relatively high absorption of X-rays is obtained.

Since the electrons for the major part are emitted in a direction perpendicular to the lamellae they have to be deflected in a direction being parallel to the lamella or tube walls. This deflection is produced by an electric field that is substantially parallel to said walls. The distribution and cross-sections of the interspace of channels between the lamellae or of the tubes are such that the resolution and photo-electron emission characteristic of any unit area of the lamella or tube assembly is sufficiently similar to any other unit area for the imaging purposes envisaged. The length to width ratio of the channel or vertical plate photocathode is preferably at least 10.

The lamellae may be corrugated so that tube like interspaces are formed by assembling corrugated sheets or corrugated sheets with flat sheets as described in the United Kingdom Pat. No. 954,248. The sheets may be made of pure metal or glass containing high atomic number (Z) elements e.g. lead or bismuth. Another way of producing microchannels with grooved material is described in the United Kingdom Pat. No. 1,064,075. The height of the passages formed by the used lamellae tubes is e.g. 0.01 to 2 mm. The cross-section of the space between the walls of the lamellae or tubes is e.g. 10 to 200 microns.

In FIG. 4 the imaging apparatus comprises a photocathode 1 composed of a plurality of lamella that whether or not are corrugated or are grooved plates or narrow tubes of a material containing one or more high atomic number ($Z > 50$) elements. Optionally a light atomic number ($Z < 50$) material covers the inner walls in order to slow down the velocity of the photoelectrons in the direction perpendicular to the lamella or tube walls. With the DC-voltage source 7 a potential difference is applied between plate 2 that optionally has photoelectron emissive properties and a conductive anode 6 which contacts the electrically conductive rear side coating 4 of an electrically insulating charge receiving sheet 3. The insulating sheet 3 is enclosed in a cassette 5 from which it can be removed. The cassette 5 contains electrically insulating coatings 9 on its inner walls. The demountable cassette 5 can be evacuated and provided with ionizable gas through the pipe fitting 8. The compressable sealing strips 10 are made e.g. of polytetrafluoroethylene.

The photocathode has to be resistive to atmospheric contact in other words may not be affected in its photoelectron emissive power by e.g. oxygen or water vapour that may enter the cassette during its demounting and the removal and replacement of the insulating film. Otherwise the opening or demounting of the cassette has to be carried out under gas conditions that do not affect the photocathode.

Photocathodes which are sensitive to atmospheric conditions are therefore only applied in high vacuum (less than $10^{-3}$ Torr) or in inert gas conditions. An example of the use of such photocathodes in an X-ray image amplifier tube has been given in The Physical Basis of Electronics of J. G. R. Van Dyck-Centrex Publishing Company — Eindhoven (1964) page 209. In said tube the photocathode system consists of a photocathode which is sensitive to light emitted by a fluorescent layer that fluoresces when struck by X-rays and the receives photoelectrons emitted by a lead layer applied to an aluminium support carrying the fluorescent layer.

The lead or uranium X-ray sensitive photocathodes that may be used as illustrated with the FIGS. 1 to 4 are not sensitive to the gases of the atmosphere so that no special precautions, e.g. the use of a lock-chamber for removing the insulating film must be taken.

It is clear, that when the imaging process proceeds under conditions in which photocathode damage is prevented the material of the photocathode may be any type of photoelectron emitting substance or composition known in the art. For example, it may be directly sensitive to X-rays, visible light and/or ultra-violet or infra-red radiation.

A non-limitative survey of photocathode material is given by H. Bruining in his book Physics and Applications of Secondary Electron Emission — Pergamon Press Ltd. — London (1954).

The invention is not limited by the type of development of the electrostatic charge pattern on the insulating target that before its development is removed from the electrostatic imaging chamber.

The development of the electrostatic charge image proceeds preferably with finely divided electrostatically attractable material that is preferably sufficiently nontransparent for visible light, but may proceed by surface deformation which is a technique known as "Thermoplastic Recording" see e.g. Journal of the SMPTE, Vol. 74, p.666–668.

According to a common technique the development proceeds by dusting the insulating film or film layer bearing the electrostatic image with finely divided solid particles that are image-wise electrostatically attracted or repulsed so that a powder image in conformity with the charge density is obtained.

The expression "powder" denotes here any solid material e.g. finely divided solid material in liquid or gaseous medium, and that can form a visible image in conformity with an electrostatic charge image.

Well-established methods of dry development of the electrostatic latent image include cascade, powder-cloud (aerosol), magnetic brush, and fur-brush development. These are all based on the presentation of dry toner to the surface bearing the electrostatic image where coulomb-forces attract or repulse the toner so that, depending upon electric field configuraion, it settles down in the electrostatically charged or uncharged areas. The toner itself preferably has a charge applied by triboelectricity.

The present invention, however, is not restricted to the use of dry toner. Indeed, it is likewise possible to apply a liquid development process (electrophoretic development) according to which dispersed particles are deposited by electrophoresis from a liquid medium.

The dispersed toner particles may be any powder forming a suspension in an insulating liquid. The particles acquire a negative or positive charge when in contact with the liquid due to the zeta potential built up with respect to the liquid phase. The outstanding advantages of these liquid developers are almost unipolarity of the dispersed particles and their appropriateness to vary high resolution work when colloidal suspensions are applied.

Suitable electrophoretic developers are described e.g. in the U.S. Pat. No. 2,907,674 and the United Kingdom Pat. No. 1,151,141, The electrostatic image can likewise be developed according to the principles of "wetting development" e.g. as described in the United Kingdom Pat. Nos. 987,766, 1,020,505 and 1,020,503.

According to a particular embodiment the charge pattern is developed in direct relation to the quantity of charge, instead of to the gradient of charge (fringe effect development). Therefor the developer material is applied while a closely spaced conductor is situated parallel to the insulating charge receiving member. (See for such type of development e.g. PS&E, Vol. 5, 1961, page 138).

According to another embodiment a transferable toner is used and the powder deposit forming the developed image is transferred from the support containing the electrostatic charge image to e.g. a flexible support e.g. transparent film or paper support. In the latter case, any known process for transferring powder image-wise from one support to another can be used; such powder transfer processes are well known in the art of electrophotography. If an electrostatically attractable powder is used, the powder image can be transferred by electrostatic attraction, e.g. according to the method disclosed in the United Kingdom Pat. Specification 658,699. Further details are contained in the U.S. Pat. Nos. 3,384,488 and 3,565,614. If a powder with ferromagnetic properties is used for developing the electrostatic latent image, the powder can be transferred by magnetic attraction. The transfer can like-wise be carried out by adhesive pick off with an adhesive tape or sheet e.g. SCOTCH brand cellophane tape.

The final powder image is e.g. fixed by heat or solvent treatment.

The charge pattern may be formed on any tape of electrographic recording material. For example the recording material is a recording web consisting of an insulating coating of plastic on a paper base having sufficient conductivity to allow electric charge to flow from the backing electrode to the paper-plastic interface. For a particular electrographic paper reference is made to the U.S. Pat. No. 3,620,831.

As substances suited for enhancing the conductivity of the rear side of transparent resin sheet are particularly mentioned antistatic agents preferably antistatic agents of the polyionic type, e.g. CALGON CONDUCTIVE POLYMER 261 (trade mark of Calgon Corporation, Inc. Pittsburgh, Pa., U.S.A.) for a solution containing 39.1% by weight of active conductive solids, which contain a conductive polymer having recurring units of the following type :

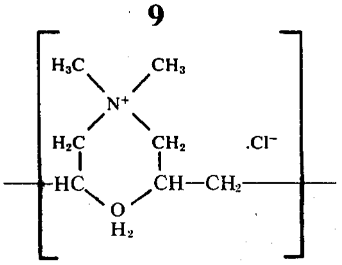

and vapour deposited films of chromium or nickel-chromium about 3.5 micrometer thick and that are about 65 to 70 percent transparent in the visible range.

Cuprous iodide conducting films can be made by vacuum depositing copper on a relatively thick resin base and then treated with iodine vapour under controlled conditions (see J. Electrochem.Soc., 110–119, Feb. 1963). Such films are over 90 percent transparent and have surface resistivities as low as 1500 ohms per square. The conducting film is preferably over-coated with a relatively thin insulating layer as described e.g. in the Journal of the SMPTE, Vol. 74, p.667.

We claim:

1. In a radiographic system for the operation with a source of X-rays which comprises:

a. an imaging chamber;

b. a pair of generally flat electrodes arranged in spaced substantially parallel relation in said chamber and defining a gap therebetween;

c. means in said chamber for emitting a pattern of electrostatic charges when exposed to an X-ray image and including an ionizing gas medium filling at least said gap between said electrodes at a pressure of at least about 0.1 Torr;

d. a removable sheet of dielectric material disposed in said gap adjacent one of said electrodes; and e. means for applying a high voltage electrical potential across said electrodes for biasing said pattern of electrostatic charges towards said dielectric sheet for deposit thereon;

the improvement comprising in combination, means for intercepting electrons deviating significantly from a direction of movement between said electrodes perpendicular to the electrode faces comprising a mesh of charge-absorbing non-secondarily emissive material, said mesh defining a plurality of narrow passages and being interposed between said electrodes with the input ends of said passages in close proximity with said other electrode and the output passage ends being open and directed towards said dielectric sheet, the ratio of the cross-sectional diameter to the length of the individual narrow passages being at least 1:4.

2. A system according to claim 1, wherein said ionizing gas medium is at a pressure below atmospheric pressure.

3. A system according to claim 1, wherein the ionizable gas has an atomic number at least equal to 36 and said gas is maintained under at least atmospheric pressure.

4. A system according to claim 1, wherein the ionizable gas has an atomic number at least equal to 36 and said gas is maintained under a pressure above atmospheric pressure,

5. A system according to claim 1, wherein the narrow passages are built up by an assembly of electrically conductive metal sheets, which sheets are corrugated in a direction parallel to the perpendicular direction of charge flow so that said corrugations cooperate to provide parallel channels for said charges.

6. A system according to claim 1, wherein the distance between the output opening ends of the narrow passages and the charge receiving dielectric material is not larger than 1.5 mm.

7. A system according to claim 1, wherein said mesh is of insulating material and the output ends thereof are in abutting contact with said dielectric sheet material to hold the same flat.

8. A system according to claim 1, wherein said mesh is maintained at substantially the same electrical potential as the electrode adjacent the input ends of the passages therein.

* * * * *